United States Patent
Chan et al.

(10) Patent No.: US 8,559,741 B2
(45) Date of Patent: *Oct. 15, 2013

(54) LOSSLESS IMAGE COMPRESSION METHOD

(75) Inventors: Chen-Hung Chan, Taoyuan County (TW); Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 605 days.

This patent is subject to a terminal disclaimer.

(21) Appl. No.: 12/792,388

(22) Filed: Jun. 2, 2010

(65) Prior Publication Data

US 2011/0299791 A1 Dec. 8, 2011

(51) Int. Cl.
*G06K 9/46* (2006.01)

(52) U.S. Cl.
USPC ............................................... 382/244

(58) Field of Classification Search
USPC ............................................... 382/244
See application file for complete search history.

(56) References Cited

U.S. PATENT DOCUMENTS

| | | | |
|---|---|---|---|
| 5,710,719 A * | 1/1998 | Houle | 382/232 |
| 5,903,676 A * | 5/1999 | Wu et al. | 382/244 |
| 8,311,119 B2 * | 11/2012 | Srinivasan | 375/240.18 |
| 2003/0021485 A1 * | 1/2003 | Raveendran et al. | 382/244 |
| 2006/0008165 A1 * | 1/2006 | Budge et al. | 382/240 |
| 2006/0013316 A1 * | 1/2006 | Fandrianto et al. | 375/240.24 |
| 2006/0115166 A1 * | 6/2006 | Sung et al. | 382/239 |
| 2006/0171596 A1 * | 8/2006 | Sung et al. | 382/232 |
| 2007/0116369 A1 * | 5/2007 | Zandi et al. | 382/240 |
| 2008/0226183 A1 * | 9/2008 | Lei et al. | 382/238 |
| 2011/0033127 A1 * | 2/2011 | Rasmusson et al. | 382/238 |

* cited by examiner

*Primary Examiner* — Jingge Wu
(74) *Attorney, Agent, or Firm* — Moris Manning & Martin LLP; Tim Tingkang Xia, Esq.

(57) ABSTRACT

A compression method is used for processing an image having a plurality of pixels, in which an image width of the image is W. The compression method includes the steps of selecting N continuous pixels from the image, where N is a positive integer greater than or equal to 2 and is less than the image width W; performing differential pulse code modulation (DPCM) so as to obtain N non-negative differences corresponding to the N pixels according to values of the N pixels; calculating to obtain a coding parameter according to the N non-negative differences; and coding the N non-negative differences according to the coding parameter.

6 Claims, 6 Drawing Sheets

LOSSLESS IMAGE COMPRESSION METHOD

BACKGROUND OF THE INVENTION

1. Field of Invention

The present invention relates to a lossless image compression method, and more particularly to a lossless image compression method requiring little memory space.

2. Related Art

With advances in electronic and information technologies, the technology for processing and displaying images on computers or various electronic devices have developed to be more and more popular. The early electronic and information technologies can only store or process low-pixel digital images. However, people have more and more demands for high-quality images, so how to process and store high-quality images becomes a very popular focus. In order to obtain high-quality images, a lossless compression method is always used when performing image compression.

However, lossless high-quality images are required to store high pixels, which is a great challenge to the computing speed of a computer and the capacity of a storage medium. For example, in a lossless compression algorithm, the lossless static image compression standard (joint photographic experts group lossless, JPEG-LS) achieves a good compression ratio by using prediction and context modeling. The context modeling needs to at least buffer a whole row of pixels of the image, so as to perform prediction in various modes. As a result, a large amount of computation and storage space is required, and the cost of an encoder is increased. As for applications not requiring high compression ratio, the algorithmic complexity of the JPEG-LS is high, so that the load of the encoder is increased.

As the requirement for the image resolution of the user becomes higher and higher, the load in image compression is also increased. If a conventional lossless compression method is used, once the resolution of an image is enhanced, the encoder has to consume much time and a larger amount of storage space to process the image into a high-quality image. In other words, the conventional lossless compression method has the problems that the computational efficiency is low due to high computational complexity and large buffer space is required.

Therefore, how to design a lossless compression method that can balance the demands for high visual quality, low computational complexity, and small buffer space is a very important issue in the industry. A heretofore unaddressed need exists in the art to address the aforementioned deficiencies and inadequacies.

SUMMARY OF THE INVENTION

In one aspect, the present invention relates to a lossless image compression method. The lossless image compression method only needs to use little memory space and can process an image having a plurality of pixels at a high speed. An image width of the image is W. The lossless image compression method comprises: (a) selecting N continuous pixels from the image, where N is a positive integer greater than or equal to 2 and is less than the image width W; (b) performing a differential pulse code modulation (DPCM) means, so as to obtain N non-negative differences corresponding to the N pixels according to values of the N pixels; (c) calculating to obtain a coding parameter according to the N non-negative differences; and (d) coding the N non-negative differences according to the coding parameter.

In order to compress the whole image, the lossless image compression method may further comprise: (e) continuing to select next N continuous pixels of the image; and (f) returning to Step (b) till all the pixels of the image are compressed.

Besides, step (a) may comprise directly receiving the selected N pixels in the image by a buffer.

The DPCM means of Step (b) may comprise: obtaining N pixel differences individually corresponding to the N pixels according to the values of the N pixels; and performing a mapping means on the N pixel differences individually, so as to obtain the N non-negative differences individually corresponding to the N pixel differences.

According to an embodiment of the present invention, the step of obtaining the N pixel differences individually corresponding to the N pixels according to the values of the N pixels may comprise: taking a value $P_0$ of the first pixel in the N pixels as the first pixel difference $d_0$; and respectively calculating a difference between a value $P_i$ of the ith pixel and a value $P_{i-1}$ of the previous pixel in the N pixels as other N−1 pixel differences, where is a positive integer, and 0<i<N.

The mapping means may comprise: when the ith pixel difference $d_i$ in the N pixel differences is greater than or equal to zero, obtaining the corresponding ith non-negative difference $n_i$ by multiplying the pixel difference $d_i$ by 2, where 0<=i=N; and when the ith pixel difference $d_i$ in the N pixel differences is less than zero, obtaining the corresponding ith non-negative difference $n_i$ by subtracting 1 from a result obtained by multiplying the pixel difference $d_i$ by 2.

The coding parameter for coding the N non-negative differences may be, $$\log_2\left(\frac{\sum_{i=0}^{N-1} n_i}{N}\right)$$

where $n_i$ is the ith non-negative difference in the N non-negative differences.

Step (d) may comprise: coding the N non-negative differences with a Golomb-Rice code according to the coding parameter.

To sum up, in the lossless image compression method according to the present invention, N pixels in the image are selected, and values of the N pixels are coded with a variable-length code (VLC). When processing the N pixels, it is unnecessary to use the other pixels in the image, so the buffer of the encoder does not need to store values of the other pixels. Therefore, the lossless image compression method has the advantages that a large amount of buffer space is saved and the compression is simple and efficient.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

The detailed features and advantages of the present invention are described below in great detail through the following embodiments, and the content of the detailed description is sufficient for those skilled in the art to understand the technical content of the present invention and to implement the present invention accordingly. Based upon the content of the specification, the claims, and the drawings, those skilled in the art can easily understand the relevant objectives and advantages of the present invention.

The present invention relates to a lossless image compression method, for processing an image having a plurality of pixels, so as to compress the image. The lossless image compression method may be implemented in an encoder.

Figure 1:
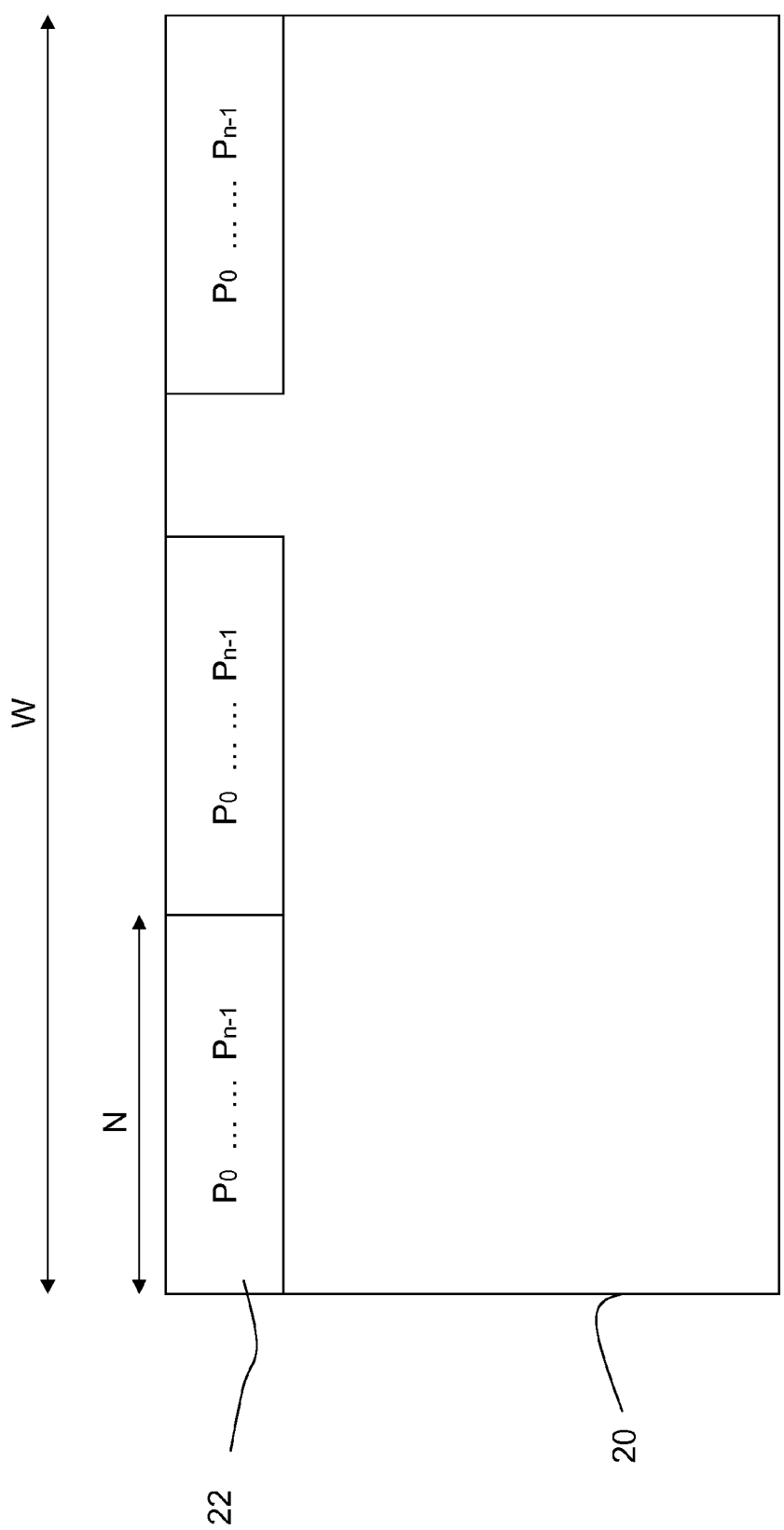
FIG. 1 is a schematic view of an image according to an embodiment of the present invention.
Figure 2:
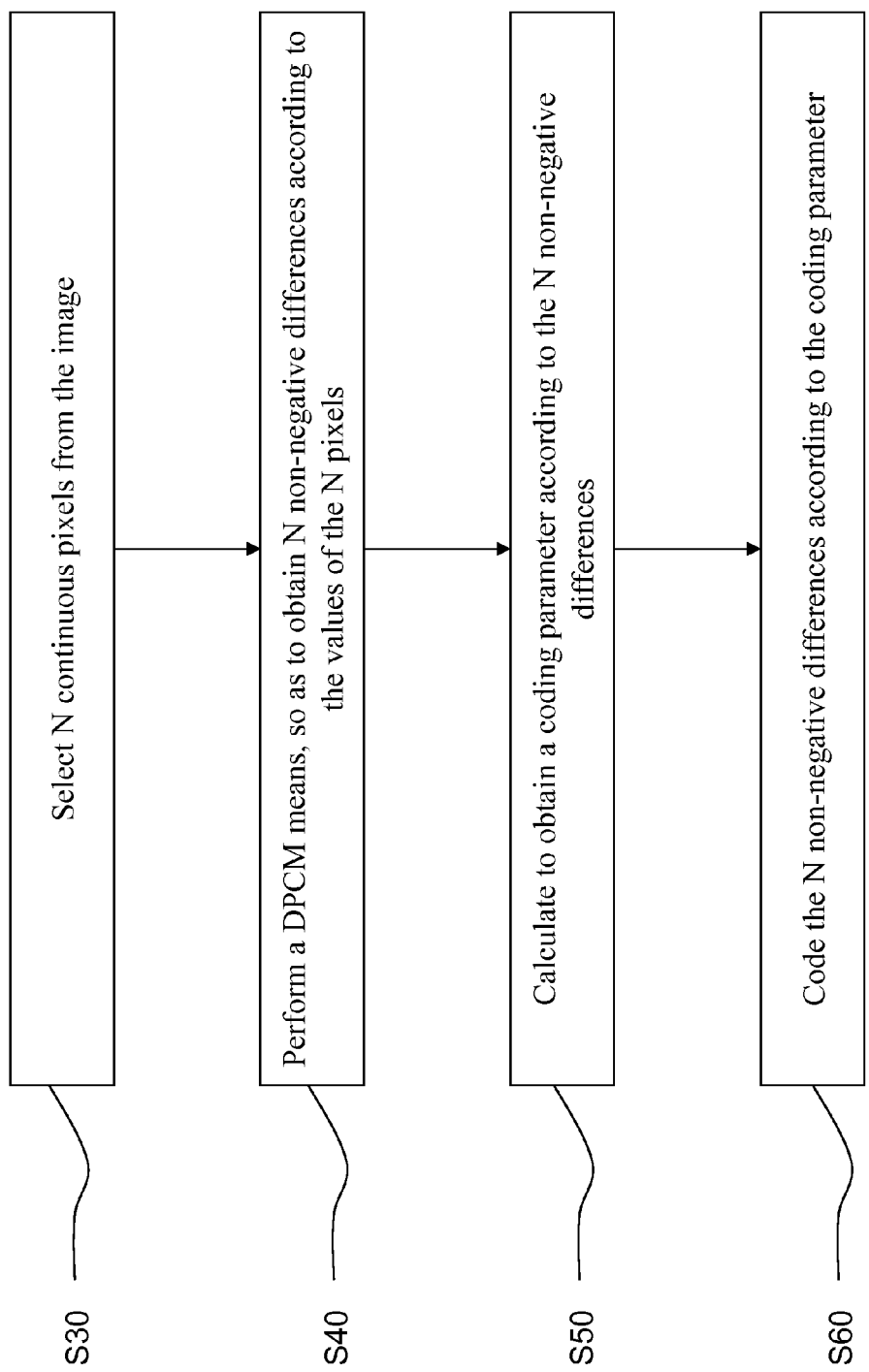
FIG. 2 is a flow chart of a lossless image compression method according to an embodiment of the present invention.

FIGS. 1 and 2 are respectively a schematic view of an image and a flow chart of a lossless image compression method according to an embodiment of the present invention.

Referring to FIGS. 1 and 2, an image 20 has W×L pixels, where W is an image width and L is an image length of the image 20. For example, the image 20 may have 640×480 pixels or 128×128 pixels, so the image width W is 640 (pixels) or 128 (pixels). Due to strong correlation, pixels in the same row of the image 20 can be used for image compression.

When performing the lossless image compression method, firstly, N continuous pixels are selected from the image 20 (Step S30), where N is a positive integer greater than or equal to 2 and is less than the image width W. In order to perform the lossless image compression method more efficiently, a number by which the image width W is divisible may be selected as N. In other words, the image width W of the image 20 is divisible by N. For example, when the image width W is 128 (pixels), N can be selected to be 16. Step S30 of selecting the N continuous pixels may be implemented with a processing window 22. The processing window 22 has a length of N, and the N pixels selected by the processing window 22 are the N pixels compressed according to the following process.

The encoder has a buffer to buffer the part of the image 20 to be processed therein. More particularly, the image 20 may be a file stored in a memory or image data transferred by a photosensitive unit of an image capturing device. Step S30 may comprise selecting the N continuous pixels from the image 20 received by the memory or the photosensitive unit, and directly receiving the values $P_0$–$P_{N-1}$ of the N pixels by the buffer.

Therefore, when the image 20 is compressed by the lossless image compression method, only N pixels of the processing window 22 are used, while the other pixels in the image 20 are not needed. As a result, the buffer of the encoder needs to store only the N pixels, not the W pixels in the whole row of the image 20.

After the N continuous pixels are selected, a differential pulse code modulation (DPCM) means is performed on the N pixels, so as to obtain N non-negative differences $n_0$–$n_{N-1}$ corresponding to the N pixels according to the values $P_0$–$P_{N-1}$ of the N pixels (Step S40). The value of the pixel may be, for example, a gray-level value, an RGB value, or a hue, a saturation, and a lightness of an HSL color space. The lossless image compression method does not limit the content of the value of the pixel.

Figure 3:
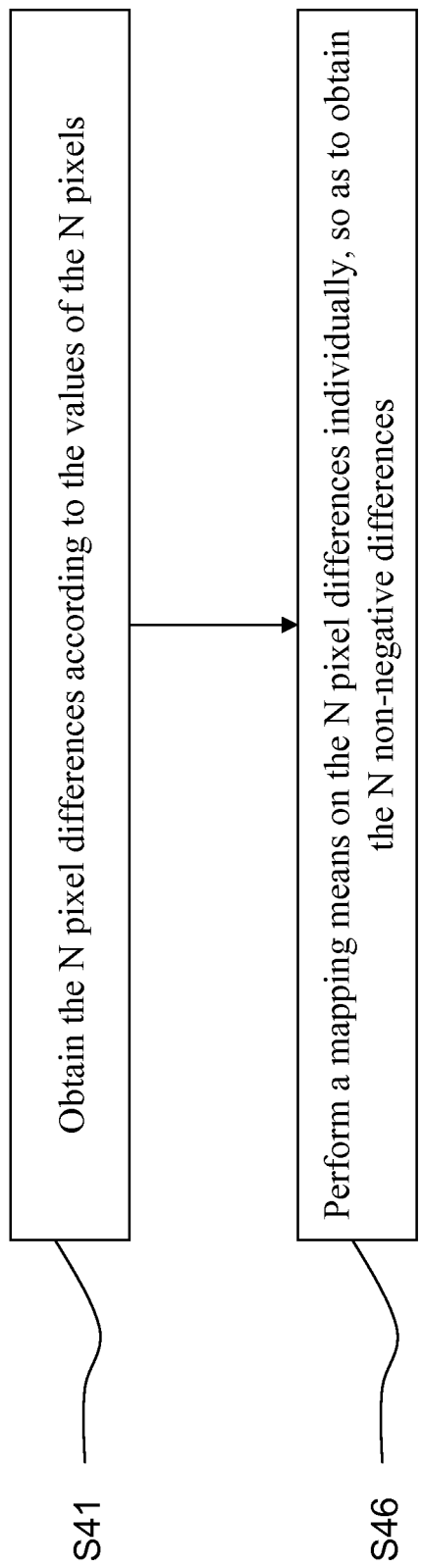
FIG. 3 is a flow chart of a DPCM means according to an embodiment of the present invention.

FIG. 3 is a flow chart of a DPCM means according to an embodiment of the present invention.

Referring to FIG. 3, in the lossless image compression method, the N non-negative differences $n_0$–$n_{N-1}$ corresponding to the processing window 22 are obtained through the DPCM means, so as to perform lossless compression. According to the DPCM means, firstly, the N pixel differences $d_0$–$d_{N-1}$ individually corresponding to the N pixels may be obtained according to the values $P_0$–$P_{N-1}$ of the N pixels (Step S41). Next, a mapping means is performed on the N pixel differences individually, so as to obtain the N non-negative differences $n_0$–$n_{N-1}$ individually corresponding to the N pixel differences (Step S46).

Figure 4:
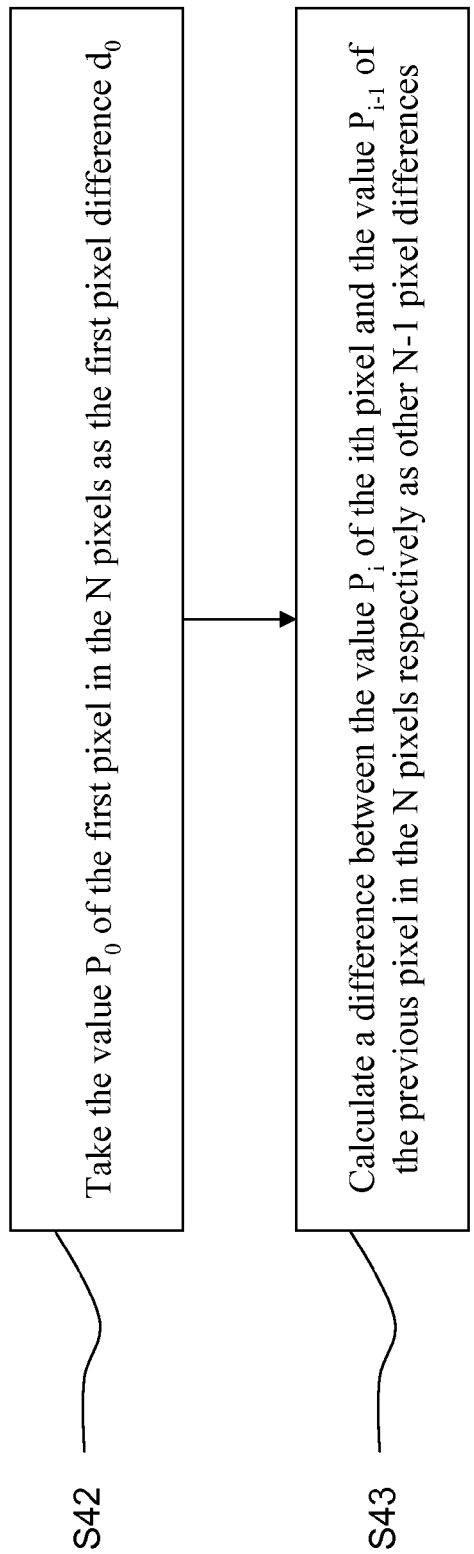
FIG. 4 is a flow chart of Step S41 according to an embodiment of the present invention.
Figure 5:
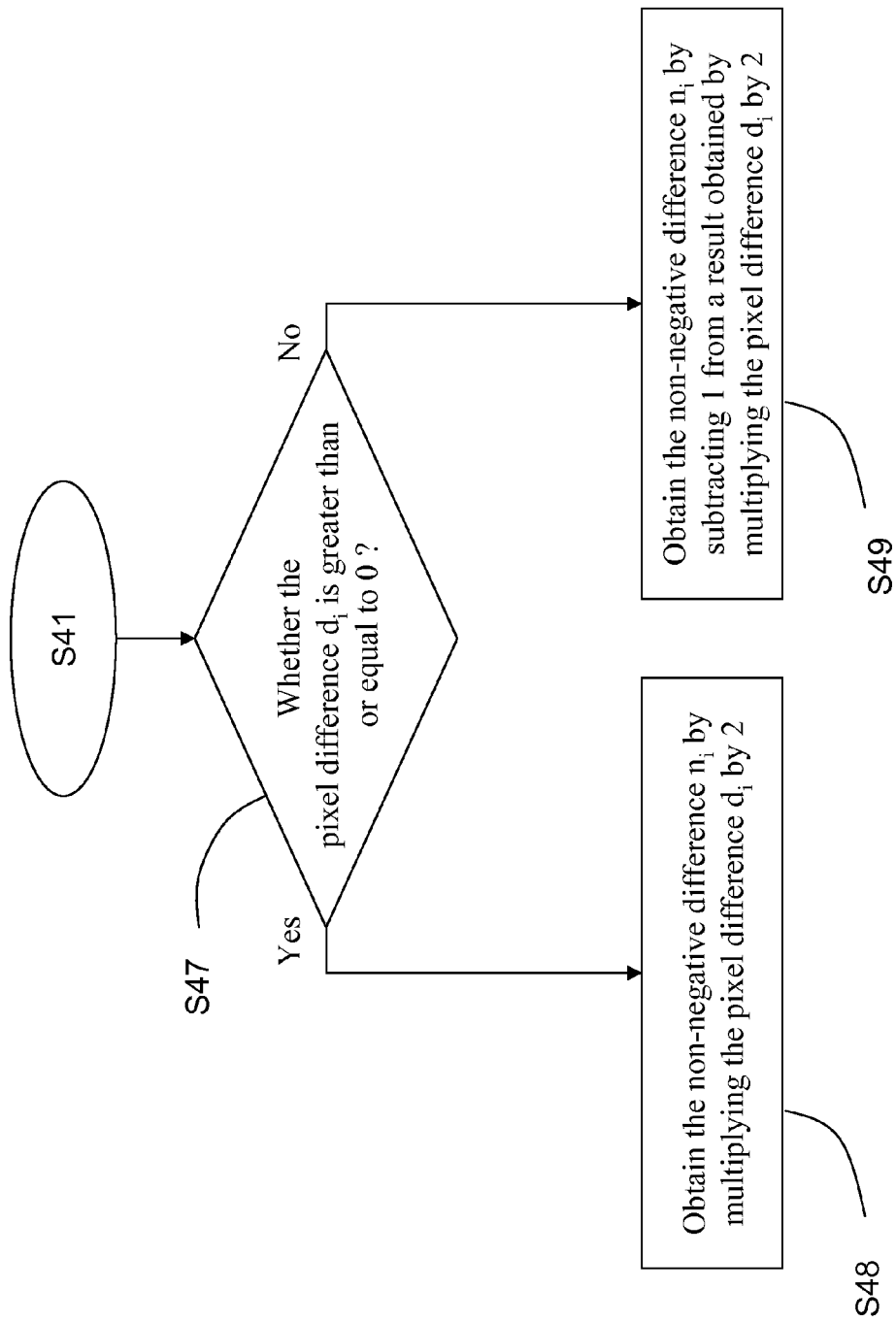
FIG. 5 is a flow chart of a mapping means according to an embodiment of the present invention.

FIGS. 4 and 5 are respectively a flow chart of Step S41 and a flow chart of the mapping means in Step S46 according to an embodiment of the present invention.

Referring to FIGS. 3, 4, and 5, in Step S41, the pixel differences $d_0$–$d_{N-1}$ may be calculated according to the following Formulas 1 and 2:

$$d_0 = P_0 \quad \text{(Formula 1)}$$

$$d_i = P_i - P_{i-1}, \ 0 < i < N, \text{ where i is a positive integer} \quad \text{(Formula 2)}$$

Wherein $P_0$ is a value of the first pixel in the N pixels in the processing window 22, $P_i$ is a value of the ith pixel in the N pixels in the processing window 22, $d_0$ is the pixel difference corresponding to $P_0$, and $d_i$ is the pixel difference corresponding to $P_i$.

In Formula 1, the value $P_0$ of the first pixel in the N pixels is taken as the first pixel difference $d_0$ (Step S42). In Formula 2, a difference between the value $P_i$ of the ith pixel and the value $P_{i-1}$ of the previous pixel in the N pixels is calculated respectively as other N−1 pixel differences $d_1$–$d_{N-1}$, where 0<i<N (Step S43). In other words, the pixel differences $d_1$–$d_{N-1}$ are obtained by subtracting the values $P_0$–$P_{N-1}$ of pixels from the values $P_0$–$P_{N-1}$ of adjacent pixels.

According to another embodiment of the present invention, the value $P_{-1}$ of the previous pixel of the first pixel in the processing window 22 in the image 20 may be stored. The value of the first pixel differences $d_0$ corresponding to the processing window 22 is the difference between $P_0$ and $P_{-1}$.

After the pixel differences $d_0$–$d_{N-1}$ corresponding to the processing window 22 are obtained in Step S41, the mapping means may determine whether the pixel difference $d_i$ is greater than or equal to 0 one by one (Step S47), and then, calculate to obtain the non-negative differences $n_0$–$n_{N-1}$ according to Formulas 3 and 4: ≥

$$n_i = 2 \times d_i, \text{ if } d_i \geq 0 \quad \text{(Formula 3)}$$

$$n_i = 2 \times d_i - 1, \text{ if } d_i < 0 \quad \text{(Formula 4)}$$

Wherein $n_i$ is a value of the ith pixel in the N non-negative differences $n_0$–$n_{N-1}$, and 0≤i<N.

As for the pixel difference $d_i$ greater than or equal to 0, in Formula 3, a value obtained by multiplying the pixel difference $d_i$ by 2 is taken as the non-negative difference $n_i$. That is, the non-negative difference $n_i$ is obtained by multiplying the pixel difference $d_i$ by 2 (Step S48). As for the pixel difference $d_i$ less than 0, in Formula 4, a value obtained by subtracting 1 from a result obtained by multiplying the pixel difference $d_i$ by 2 is taken as the non-negative difference $n_i$. That is, the non-negative difference $n_i$ is obtained by subtracting 1 from a result obtained by multiplying the pixel difference $d_i$ by 2 (Step S49).

In this way, the N non-negative differences $n_0$–$n_{N-1}$ corresponding to the N pixels can be obtained according to the values $P_0$–$P_{N-1}$ of the N pixels in Step S40.

Referring to FIG. 2 again, a coding parameter k is calculated according to the N non-negative differences $n_0$–$n_{N-1}$ (Step S50); and the N non-negative differences $n_0$–$n_{N-1}$ are coded according to the coding parameter k (Step S60).

Step S60 may comprise coding the N non-negative differences $n_0$–$n_{N-1}$ with a Golomb-Rice code according to the coding parameter k.

The coding parameter for processing the N non-negative differences may be.

$$\log_2\left(\frac{\sum_{i=0}^{N-1} n_i}{N}\right)$$

The Golomb-Rice code is a variable-length code (VLC), in which a short code is assigned to a value with high probability of occurrence. According to the Golomb-Rice code, a divisor m is set according to the coding parameter k. Next, the N non-negative differences $n_0$–$n_{N-1}$ are divided by the divisor m to obtain corresponding N quotients Q and remainders R. The divisor m may be the kth power of 2, $2^k$.

Next, the Golomb-Rice code codes the obtained quotients Q into unary codes, and codes the remainders R into binary codes of k-bit length.

For example, it is assumed that the non-negative difference $n_0$ is 163, and the coding parameter k is 5. Thus, it can be calculated that the quotient Q of the non-negative difference $n_0$ is 5, and the remainder R is 3. Then, the quotient Q of the non-negative difference $n_0$ is coded into 111110 with a unary code, and the remainder R is coded into 00011 with a binary code.

Figure 6:
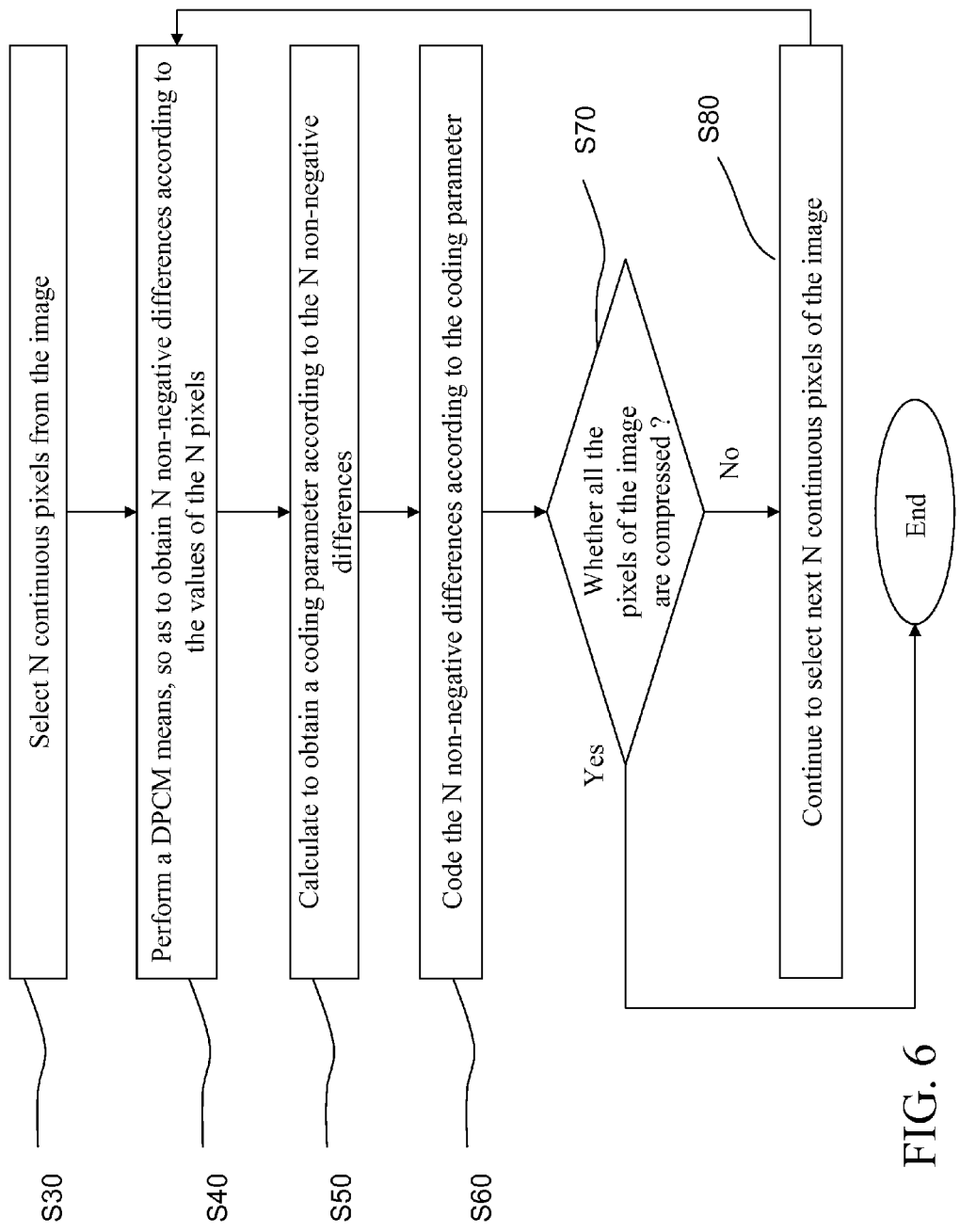
FIG. 6 is a flow chart of a lossless image compression method according to another embodiment of the present invention.

In this way, the values $P_0$–$P_{N-1}$ of the N pixels in the processing window 22 can be compressed into a lossless VLC, and the whole image 20 can be compressed by the lossless image compression method. FIG. 6 is a flow chart of a lossless image compression method according to another embodiment of the present invention.

Referring to FIG. 6, after Steps S30 to S60 are performed to compress the N pixels in the processing window 22, whether all the pixels in the image 20 are compressed can further be determined (Step S70). If the image 20 has not been completely compressed, selection of next N continuous pixels of the image 20 is continued (Step S80), and the N pixels selected in Step S80 are processed according to Steps S40, S50, and S60. If the image 20 has been compressed into a compressed image file, the process ends.

That is, the lossless image compression method continues to select additional N pixels subsequent to the N pixels selected in Step S30, and processes the additionally selected N pixels as a new processing window 22.

To sum up, in the lossless image compression method according to the present invention, N pixels in the image are selected, and values of the selected pixels are coded with a VLC. Since the other pixels in the image are not used in compression, the buffer of the encoder only needs to store values of the N pixels, thereby saving a large amount of buffer space. Moreover, the lossless image compression method processes only the values of the N pixels in each image window one by one till the whole image is compressed, and thus has the advantage of being simple and efficient.

What is claimed is:

1. A lossless image compression method, for processing an image having a plurality of pixels, wherein an image width of the image is W, the lossless image compression method comprising:
   (a) selecting N continuous pixels from the image, where N is a positive integer greater than or equal to 2 and is less than the image width W;
   (b) performing a differential pulse code modulation (DPCM) means, so as to obtain N non-negative differences corresponding to the N pixels according to values of the N pixels, the DPCM means comprising:
      obtaining N pixel differences individually corresponding to the N pixels according to the values of the N pixels; and
      performing a main means on the N pixel differences individually, so as to obtain the N non-negative differences individually corresponding to the N pixel differences, the mapping means comprising:
         when the ith pixel difference $d_i$ in the N pixel differences is greater than or equal to zero, obtaining the corresponding ith non-negative difference $n_i$ by multiplying the pixel difference $d_i$ by 2, where $0<=i<N$; and
         when the ith pixel difference $d_i$ in the N pixel differences is less than zero, obtaining the corresponding ith non-negative difference $n_i$ by subtracting 1 from a result obtained by multiplying the pixel difference $d_i$ by 2;
   (c) calculating to obtain a coding parameter according to the N non-negative differences; and
   (d) coding the N non-negative differences according to the coding parameter.

2. The lossless image compression method according to claim 1, further comprising:
   (e) continuing to select next N continuous pixels of the image; and
   (f) returning to the Step (b) till all the pixels of the image are compressed.

3. The lossless image compression method according to claim 1, wherein the obtaining the N pixel differences individually corresponding to the N pixels according to the values of the N pixels comprises:
   taking a value $P_0$ of the first pixel in the N pixels as the first pixel difference $d_0$; and
   respectively calculating a difference between a value $P_i$ of the ith pixel and a value $P_{i-1}$ of the previous pixel in the N pixels as other N−1 pixel differences, where i is a positive integer, and $0<i<N$.

4. The lossless image compression method according to claim 1, wherein the coding parameter is $$\log_2\left(\frac{\sum_{i=0}^{N-1} n_i}{N}\right)$$

and $n_i$ is the ith non-negative difference in the N non-negative differences.

5. The lossless image compression method according to claim 1, wherein the Step (d) comprises:
   coding the N non-negative differences with a Golomb-Rice code according the coding parameter.

6. The lossless image compression method according to claim 1, wherein the Step (a) comprises directly receiving the selected N pixels in the image by a buffer.

* * * * *